(12) United States Patent
Ebner et al.

(10) Patent No.: US 9,789,845 B2
(45) Date of Patent: Oct. 17, 2017

(54) COMBUSTION CHAMBER COMPRISING AN OPENING DEVICE FOR A COMPRESSED GAS TANK OF A HYBRID INFLATOR, HYBRID INFLATOR, AIRBAG MODULE, VEHICLE SAFETY SYSTEM AND METHOD OF DISCHARGING FLUID FROM AN INFLATOR

(71) Applicant: TRW Airbag Systems GmbH, Aschau am Inn (DE)

(72) Inventors: Johannes Ebner, Muhldorf (DE); Thomas Kapfelsperger, Muhldorf (DE)

(73) Assignee: TRW Airbag Systembs GmbH (DE)

( * ) Notice: Subject to any disclaimer, the term of this patent is extended or adjusted under 35 U.S.C. 154(b) by 44 days.

(21) Appl. No.: 14/948,545

(22) Filed: Nov. 23, 2015

(65) Prior Publication Data

US 2016/0159314 A1 Jun. 9, 2016

(30) Foreign Application Priority Data

Dec. 5, 2014 (DE) .......................... 10 2014 018 007

(51) Int. Cl.
| | |
|---|---|
| *B60R 21/26* | (2011.01) |
| *B60R 21/264* | (2006.01) |
| *B60R 21/272* | (2006.01) |
| *F42B 3/04* | (2006.01) |
| *B60R 21/261* | (2011.01) |

(52) U.S. Cl.
CPC .......... *B60R 21/264* (2013.01); *B60R 21/261* (2013.01); *B60R 21/26005* (2013.01); *B60R 21/272* (2013.01); *F42B 3/045* (2013.01); *B60R 2021/2612* (2013.01); *B60R 2021/26029* (2013.01); *B60R 2021/2642* (2013.01)

(58) Field of Classification Search
CPC ... B60R 21/272; B60R 21/268; B60R 21/264; B60R 2021/2633; B60R 21/274
USPC ......................................................... 280/737
See application file for complete search history.

(56) References Cited

U.S. PATENT DOCUMENTS

| | | | | |
|---|---|---|---|---|
| 5,242,194 | A * | 9/1993 | Popek | B60R 21/272 137/68.13 |
| 5,421,609 | A * | 6/1995 | Moore | F16K 17/1626 280/737 |
| 5,462,307 | A * | 10/1995 | Webber | B60R 21/272 222/5 |
| 5,496,062 | A * | 3/1996 | Rink | B60R 21/272 102/202.14 |

(Continued)

*Primary Examiner* — Faye M Fleming
(74) *Attorney, Agent, or Firm* — Tarolli, Sundheim, Covell & Tummino LLP (57) ABSTRACT

The invention relates to a combustion chamber (10) comprising an opening device for a compressed gas tank (21) of a hybrid inflator (20), wherein the combustion chamber (30) comprises a sleeve-type combustion chamber sidewall (34) confining a combustion chamber interior (31) and a combustion chamber bottom (10), wherein the opening device is arranged on a surface (11) of the combustion chamber bottom (10) facing away from the combustion chamber interior (31) and faces away from the combustion chamber interior (31). In accordance with the invention, the combustion chamber bottom (10) is tightly connected to the combustion chamber sidewall (34) so that in the case of operation the combustion chamber bottom (10) is bendable.

28 Claims, 4 Drawing Sheets

(56) References Cited

U.S. PATENT DOCUMENTS

| | | | | |
|---|---|---|---|---|
| 5,653,463 | A | * | 8/1997 | Jeong ............... B60R 21/272 222/5 |
| 5,788,275 | A | * | 8/1998 | Butt ............... B60R 21/272 137/68.13 |
| 6,460,461 | B2 | * | 10/2002 | Perotto ............ B60R 21/272 102/288 |
| 2007/0138775 | A1 | * | 6/2007 | Rossbach ........... B60R 21/26 280/736 |
| 2009/0045612 | A1 | * | 2/2009 | Cox ............... B60R 21/268 280/741 |
| 2016/0016531 | A1 | * | 1/2016 | Seidl ............... B60R 21/264 102/202.5 |
| 2017/0008482 | A1 | * | 1/2017 | Kobayashi ......... B60R 21/274 |

\* cited by examiner

COMBUSTION CHAMBER COMPRISING AN OPENING DEVICE FOR A COMPRESSED GAS TANK OF A HYBRID INFLATOR, HYBRID INFLATOR, AIRBAG MODULE, VEHICLE SAFETY SYSTEM AND METHOD OF DISCHARGING FLUID FROM AN INFLATOR

RELATED APPLICATION

This application claims priority from German Application No. 10 2014 018 007.7, filed Dec. 5, 2014; the subject matter of which is incorporated herein by reference in its entirety.

BACKGROUND OF THE INVENTION

The invention relates to a combustion chamber comprising an opening device for a compressed gas tank of a hybrid inflator, the combustion chamber comprising a sleeve-type combustion chamber sidewall confining the combustion chamber interior and a combustion chamber bottom, wherein the opening device is arranged on s surface of the combustion chamber bottom facing away from the combustion chamber interior end faces away from the combustion chamber interior. Apart from that, the invention relates to a hybrid inflator, an airbag module, a vehicle safety system and a method of discharging fluid from an inflator.

Occupant restraining systems for automotive vehicles usually include airbag modules comprising an airbag which in the event of crash is inflated so as to reduce the probability of body parts of vehicle occupant colliding with a vehicle component. In order to inflate the airbag in the event of crash, for example hybrid inflators are provided which include a compressed gas tank containing compressed gas or, resp., fluids and a pyrotechnical subassembly, wherein the pyrotechnical subassembly serves for releasing the hybrid inflator and/or heating the gas which is originally compressed and flows out in the case of function. The compressed gas of said hybrid inflator may be sealed toward the pyrotechnical subassembly in a pressure-tight manner. This is possible, for example, by means of a burst membrane and, resp., a burst cap to which in the idle state the compressed gas stored in the compressed gas tank thus can be or is applied to an end face and/or its outer peripheral side. The term "in the idle state" is to be understood to the effect that the hybrid inflator has not yet been activated, or in other words that the burst membrane is closed and no activation signal has been provided in response to which the burst membrane is to be opened and, resp., burst.

Document EP 1 053 915 B1, in particular FIGS. 1 to 4 thereof, show the structure of a hybrid inflator including a storage chamber and a pyrotechnical ignition device. The storage chamber is separated from a combustion chamber by means of an inner cap. In the case of activation and, resp., in the case of operation, the inner cap or, resp., the inner membrane is undone by a piston-type device. For this, a movably supported piston and a guiding device are provided, wherein in the case of activation the piston is pressurized so that the piston pierces the inner cap and, resp., the inner membrane. For guiding the piston individual supports and guide means are required. This is a relatively complex construction consisting of many components and seals, which means considerable efforts for a faultless case of operation.

SUMMARY OF THE INVENTION

It is the object of the present invention to state a further developed combustion chamber comprising an opening device for a compressed gas tank so as to overcome the afore-mentioned drawbacks. In particular, a combustion chamber comprising an opening device consisting of as few components as possible and having a simple and inexpensive design is to be stated. It is a further object to further develop a hybrid inflator so that an optimally controlled discharge into an airbag is enabled.

Moreover, it is an object of the invention to describe an airbag module, a vehicle safety system as well as a method of discharging a fluid from an inflator comprising a further developed combustion chamber including an opening device for a compressed gas tank of a hybrid inflator and/or comprising a further developed hybrid inflator.

In accordance with the invention, this object is achieved with respect to the combustion chamber comprising an opening device for a compressed gas tank of a hybrid inflator by the subject matter of claim 1, with respect to the hybrid inflator by the subject matter of claim 6, with respect to the airbag module by the subject matter of claim 19, with respect to the vehicle safety system by the subject matter of claim 20 and with respect to the method of exhausting fluid from an inflator by the subject matter of claims 21 and 22.

Advantageous and expedient configurations of the combustion chamber according to the invention comprising an opening device for a compressed gas tank of a hybrid inflator and, resp., of the hybrid inflator according to the invention are described in the subclaims.

The invention is based on the idea to state a combustion chamber comprising an opening device for a compressed gas tank of a hybrid inflator, the combustion chamber including a sleeve-type combustion chamber sidewall confining a combustion chamber interior and a combustion chamber bottom, wherein the opening device is arranged on a surface of the combustion chamber bottom facing away from the combustion chamber interior and faces away from the combustion chamber interior.

In accordance with the invention, the combustion chamber bottom is tightly connected to the combustion chamber sidewall so that the combustion chamber bottom can be bent in the case of operation. When the combustion chamber bottom is bent, it continues being connected to the combustion chamber sidewall. Preferably, the combustion chamber bottom is and, respectively, remains tightly connected along its entire periphery to the combustion chamber sidewall so that the combustion chamber bottom cannot perform any unfolding movement according to the type of a hinge movement.

The combustion chamber bottom thus comprises an opening device facing away from the combustion chamber interior, wherein in the case of operation the opening device can be bent along with the combustion chamber bottom. In the case of operation, i.e. when the hybrid inflator is triggered as specified, and hence when a propellant is burnt in the combustion chamber according to the invention, the pressure in the combustion chamber is increased so that the combustion chamber bottom bends in the direction of a compressed gas tank to be opened, wherein the opening device opens a membrane closing the compressed gas tank. The combustion chamber according to the invention comprising an opening device thus requires no displaceable elements and components, respectively, as the combustion chamber bottom is designed to be bendable with the opening device arranged thereon so that no additional movable element is required. The design comprises a small number of components and exhibits a simple construction.

The sleeve-type combustion chamber sidewall may be cylindrical, preferably circular-cylindrical. The combustion chamber interior which is confined by the sleeve-type combustion chamber sidewall consequently may equally have a cylindrical, especially circular-cylindrical volume. The combustion chamber bottom preferably has a shape adapted to the combustion chamber sidewall. In other words, the combustion chamber bottom is complementary to the cross-section of the combustion chamber interior. The combustion chamber bottom may have a round shape when a circular-cylindrical combustion chamber interior is formed. In other cylindrical forms of the combustion chamber interior corresponding square, rectangular, elliptical, oval and, resp., polygonal shapes can be formed.

According to the invention, the combustion chamber bottom is tightly connected to the combustion chamber sidewall. The combustion chamber bottom can be connected to the combustion chamber sidewall by form closure and/or by material connection and/or by force closure. For example, the combustion chamber bottom may be welded to the combustion chamber sidewall. It is also imaginable that the combustion chamber bottom is press-fitted into the sleeve-type combustion chamber sidewall. Hence the combustion chamber bottom itself is not movably formed or supported. In the case of activation or case of operation, the combustion chamber bottom can be bent or curved along with the opening device arranged on the surface of the combustion chamber bottom facing away from the combustion chamber interior in the direction of a compressed gas tank to be opened.

The opening device may be an opening piercer, especially in the form of a pyramid tip and/or round piercer and/or flat piercer and/or cross piercer and/or ring cutter. The opening device is formed, in other words, as an extension facing away from the combustion chamber interior, wherein the extension can open the membrane of a compressed gas tank to be opened, for example.

In the combustion chamber bottom and/or in the combustion chamber sidewall at least one discharge orifice may be formed which has a sealing cover, especially a plugging, on the side of the combustion chamber interior.

In one embodiment of the invention, in the combustion chamber bottom on the side of the opening device, i.e. on the surface of the combustion chamber bottom facing away from the combustion chamber interior, at least one spacer may be formed especially in the form of an extension and/or a groove and/or a flute and/or a recess and/or an indentation. In other words, the combustion chamber bottom may be provided on the side of the opening device with a structure or exhibit a structure so that the discharge orifices can produce sufficient fluid communication with a mixing chamber, even in the case that the combustion chamber bottom rests on a different element of the compressed gas tank and/or of the hybrid inflator.

In the combustion chamber bottom on the side of the opening device plural spacers may be provided in the form of straight and/or curved lines extending from a first, especially concentric inner circle to a second, especially concentric outer circle, wherein at least one discharge orifice is formed on the second outer circle. The discharge orifice can be, for instance, a segment or a portion of at least one spacer, it is also possible to configure the at least one discharge orifice separately and, resp., independently.

Preferably plural discharge orifices are formed in the combustion chamber bottom. The discharge orifices are preferably of circular shape. Preferably the discharge orifices are formed regularly and, resp., evenly spaced from each other on a preferably concentric circle of the combustion chamber bottom. Preferably at least two, especially at least four, especially at least eight, especially at least twelve, especially at least fourteen discharge orifices are formed in the combustion chamber bottom.

As regards a hybrid inflator, the object is achieved by the features of claim 6. Said hybrid inflator including a compressed gas tank comprises a combustion chamber according to the invention including an opening device for a compressed gas tank.

According to the invention, the compressed gas tank includes an opening which in an idle state of the hybrid inflator is closed by a membrane and in the case of operation can be destroyed such that the compressed gas tank is in fluid communication with a mixing chamber. Accordingly, after destroying the closing membrane, gas can How out of the compressed gas tank into the mixing chamber.

In the combustion chamber bottom and/or in the combustion chamber sidewall of the combustion chamber at least one discharge orifice is formed which in the idle state of the hybrid inflator is closed on the side of the combustion chamber interior by a sealing cover, especially by a plugging, wherein the sealing cover can be destroyed in the case of operation such that the combustion chamber is in fluid communication with the mixing chamber and/or an airbag. Hence in the combustion chamber bottom of the hybrid inflator according to the invention at least one discharge orifice can be formed which in the idle state, i.e. in the non-activated state of the hybrid inflator, is provided with a sealing cover. The sealing cover is located on the side of the combustion chamber interior of the combustion chamber bottom, in the case of operation, i.e. upon activation of the hybrid inflator, the sealing cover of the at least one discharge orifice is destructible so that the combustion chamber is fluid-communicated with the mixing chamber of the hybrid inflator.

In the combustion chamber sidewall of the combustion chamber of the hybrid inflator according to the invention equally a discharge orifice may be formed which is closed by a sealing cover on the side of the combustion chamber interior in the idle state. Said sealing cover is equally destructible in the case of operation so that the combustion chamber is fluid-communicated with an airbag, for example. If both the combustion chamber bottom and the combustion chamber sidewall have discharge orifices, all discharge orifices are provided with a sealing cover en the side of the combustion chamber interior, with the sealing cover being preferably similarly dimensioned with respect to all discharge orifices. Consequently, in the case of operation both the sealing covers of the discharge orifices of the combustion chamber bottom and the sealing covers of the discharge orifices of the combustion chamber sidewall can be destroyed. After destruction of the sealing cover(s) the combustion chamber is fluid-communicated both with the mixing chamber and with the airbag. Preferably, plural discharge orifices, preferably at least four, especially at least eight, especially at least twelve, especially at least fourteen discharge orifices are formed in the combustion chamber bottom and/or in the combustion chamber sidewall.

Summing up, in the case of operation both a membrane of the compressed gas tank and a sealing cover of a discharge orifice of the combustion chamber bottom and/or of the combustion chamber sidewall are destructible. The destruction of the membrane of the compressed gas tank is effectuated due to pressure on the combustion chamber inside causing the combustion chamber bottom to flex or bend. The combustion chamber bottom is forced away from the combustion chamber interior. Since at the combustion chamber bottom an opening device, especially in the form of an opening piercer or ring cutter, is provided or arranged, the opening device is forced away from the combustion chamber interior due to the bending of the combustion chamber bottom. The opening device arranged on the surface of the combustion chamber bottom facing away from the combustion chamber interior carries out a lifting movement corresponding to the bending or flexing of the combustion chamber bottom. Accordingly, the opening device is moved or forced in the direction of the membrane of the compressed gas tank. The opening device opens and/or destroys the membrane while contacting or penetrating the latter.

Moreover, during operation the sealing cover of the at least one discharge orifice of the combustion chamber bottom and/or of the combustion chamber sidewall is destroyed. The destruction of the sealing cover, especially the plugging, is performed by bursting of the material and, resp., the cover.

Preferably, in the case of operation the fluid communication from the compressed gas tank to the mixing chamber can be established earlier than the fluid communication from the combustion chamber to the mixing chamber. In other words, during operation the membrane of the compressed gas tank is destroyed earlier than the sealing cover of the at least one discharge orifice of the combustion chamber.

The sealing cover, especially the plugging, of the at least one discharge orifice is dimensioned so that in the case of operation the fluid communication from the compressed gas tank to the mixing chamber can be established earlier than the fluid communication from the combustion chamber to the mixing chamber.

Moreover, the sealing cover, especially the plugging, of the at least one discharge orifice is dimensioned so that in the case of operation such pressure can be built up in the combustion chamber that the membrane of the compressed gas tank is destructible by the opening device, especially by the opening piercer or the ring cutter with preferably at least one outlet, by bending the combustion chamber bottom in the direction of the membrane.

Moreover, the sealing cover, especially the plugging, of the at least one discharge orifice is to be dimensioned so that during operation the combustion chamber is fluid-communicated with the mixing chamber and/or with an airbag.

In other words, the plugging of the at least one discharge orifice is to be designed and dimensioned so that in each case of operation and, resp., activation sufficient pressure can build up in the combustion chamber interior so that the opening device arranged at the combustion chamber bottom is reliably moved toward the membrane of the compressed gas tank and reliably opens the membrane. Due to the destroyed and, resp., opened membrane of the compressed gas tank, gas present in the compressed gas tank, especially cold gas, can flow into a mixing chamber. On the other hand, the plugging and, resp., the sealing cover of the at least one discharge orifice is to be designed and dimensioned so that it is destructible in time and, respectively, opens in time to avoid high pressures in the combustion chamber interior, and that hot gas, i.e. gas flowing out of the combustion chamber, can be introduced to the mixing chamber.

Summing up, the seeing cover and, resp., the plugging of the at least one discharge orifice is to be dimensioned, wherein this relates to both the material selection and the thickness of the sealing cover material, that the membrane of the compressed gas tank is destroyed earlier than the sealing cover and, resp., the plugging. The cold gas of the compressed gas tank consequently may first flow into the mixing chamber, wherein the cold gas of the compressed gas tank moreover flows first into the airbag through orifices located in the mixing chamber in the direction of the airbag. After further pressure increase in the combustion chamber interior the sealing cover, especially the plugging, can be destroyed so that hot gas of the combustion chamber and, resp., starting from the combustion chamber interior flows into the mixing chamber and is cooled due to the cold gas already provided there.

The operating pressure of the combustion chamber is preferably designed such that even if the sealing cover and, resp., the plugging is opened early, the pressure prevailing in the combustion chamber interior is sufficient to open the membrane with the aid of the opening device due to the bendable combustion chamber bottom. If the combustion chamber sidewall includes discharge orifices, it is imaginable that also these discharge orifices or this discharge orifice include(s) a sealing cover, especially in the form of a plugging, the sealing cover being configured or arranged on the side of the combustion chamber interior. The cold gas is mixed with the hot gas generated in the combustion chamber interior directly in the airbag when discharge orifices are formed in the combustion chamber sidewall.

With the aid of the hybrid inflator according to the invention, a controlled discharge of cold gas and hot gas or combustion gas, resp., is indicated. Since first cold gas and after that combustion gas, especially hot combustion gas, flow into an airbag, this is especially gentle to an airbag of an airbag module.

Moreover, it is possible to design the compressed gas tank, which can also be referred to as cold gas cylinder, for filling pressure. This is accompanied by corresponding weight savings.

In addition, the hybrid inflator may be formed at the combustion chamber bottom with the ring cutter and an ignition sleeve preferably including an overflow opening as a pre-assembled, especially integrally formed, subassembly, wherein especially the ring cutter and the ignition sleeve are arranged on opposite end faces of the preferably substantially disk-shaped combustion chamber bottom.

Also, the ignition sleeve may comprise an ignition chamber preferably including an ignition mixture and may extend into the combustion chamber such that an annular chamber especially including propellent is formed around the ignition sleeve.

Further, during operation the ignition chamber can be fluid-communicated with the combustion chamber, especially the annular chamber, and with the mixing chamber and/or an airbag preferably through the overflow opening.

In addition, it is possible that in the case of operation the interior of the compressed gas tank is fluid-communicated through the interior of the annular chamber, especially via the outlet thereof, with the mixing chamber and/or an airbag.

The compressed gas tank of the hybrid inflator according to the invention may further include a membrane holder comprising the membrane. Preferably the combustion chamber bottom when pressurized on the side of the combustion chamber interior can be supported on the membrane holder.

When in the case of operation or activation the combustion chamber bottom of the combustion chamber according to the invention and of the hybrid inflator according to the invention closely approaches the membrane holder of the compressed gas tank and rests on the same, the efficient flow cross-section for the gas present in the compressed gas tank might be or become too small for a functional exhaust into a mixing chamber and, resp., into an airbag of an airbag module. In order to prevent said drawback and to overcome said drawback, in the combustion chamber bottom on the side of the opening device at least one spacer, especially in the form of an extension and/or a groove and/or a flute and/or a recess and/or an indentation may be configured. Alternatively or additionally, the membrane holder may include on the side facing the opening direction at least one spacer, especially in the form of an extension and/or a groove and/or a flute and/or a recess and/or an indentation. In other words, both the combustion chamber bottom, especially the side of the opening device of the combustion chamber bottom, and/or the membrane holder, especially the side of the membrane holder facing the opening direction, may be provided with a structure. Said structure and, resp., the at least one spacer ensure that the gas of the compressed gas tank can discharge from the compressed gas tank even when the combustion chamber bottom is adjacent to or approaches the membrane holder.

Both the combustion chamber according to the invention including an opening device for a compressed gas tank of a hybrid inflator and the hybrid inflator according to the invention feature a small number of components which are easy to design. Moreover, in contrast to known opening devices for a compressed gas tank, movably supported and displaceable components are dispensed with. Furthermore, the present combustion chamber according to the invention and the hybrid inflator according to the invention distinguish by inexpensive manufacture thereof.

As regards an airbag module, the object is achieved by the features of claim 19. Such airbag module according to the invention can comprise a combustion chamber according to the invention including an opening device for a compressed gas tank of a hybrid inflator and/or a hybrid inflator according to the invention.

As regards the vehicle safety system, the object is achieved by the features of claim 20. Accordingly, a vehicle safety system includes a combustion chamber according to the invention having an opening device for a compressed gas tank of a hybrid inflator and/or a hybrid inflator according to the invention and/or an airbag module according to the invention. Advantages similar to those already explained in connection with the combustion chamber according to the invention including an opening device for a compressed gas tank of a hybrid inflator and/or with the hybrid inflator according to the invention are resulting.

As regards a method of discharging fluid from an inflator, the object is achieved by the features of claims 21 and 22. Accordingly, the method according to the invention comprises the following steps of: opening a membrane of a compressed gas tank and discharging pre-compressed gas, especially cold gas, from the compressed gas tank via a mixing chamber through an outer orifice, especially side orifice, of the inflator; optionally releasing an overflow orifice of an ignition sleeve for igniting a propellant; subsequently opening a sealing cover of a combustion chamber interior by burning the propellant and discharging hot gases from the combustion chamber interior into the mixing chamber; mixing part of the pre-compressed gas, especially cold gas, and of the hot gas in the mixing chamber to form mixed gas; discharging the mixed gas from the mixing chamber through the outer opening, especially lateral opening, of the inflator.

Also, another method according to the invention for discharging fluid from an inflator can be characterized in that the membrane of the compressed gas tank is opened by bending a combustion chamber bottom, wherein the membrane is pierced by an opening device, especially an opening piercer or a ring cutter, wherein at least portions of the combustion chamber bottom, preferably along its entire periphery, remain fixedly connected to the inflator housing, especially to a combustion chamber sidewall.

BRIEF DESCRIPTION OF THE DRAWINGS

Hereinafter the invention will be illustrated in detail by way of embodiments with reference to the enclosed schematic figures in which.

DESCRIPTION

Hereinafter, equal reference numerals will be used for equal and equally acting parts.

Figure 1:
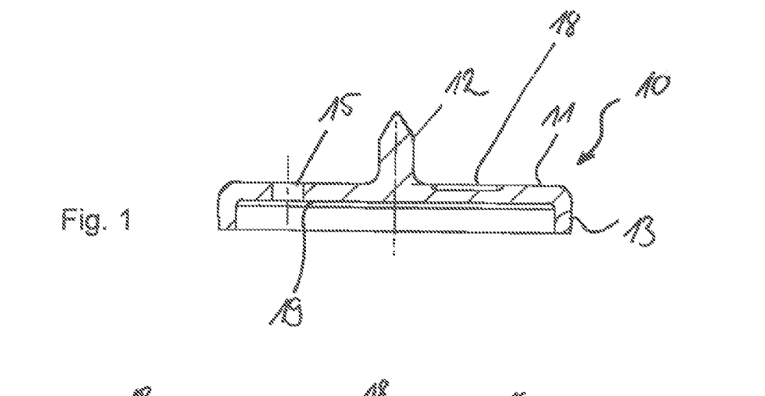
FIG. 1 is a sectional representation of a combustion chamber bottom of a combustion chamber.

FIG. 1 shows a combustion chamber bottom of a combustion chamber according to the invention. At the combustion chamber bottom an opening device in the form of an opening piercer 12 is arranged on the surface 11 of the combustion chamber bottom 10 facing away from the combustion chamber interior (cf. FIG. 3). In the shown example the combustion chamber bottom 10 and the opening piercer 12 are formed in one piece. It is further imaginable that the opening device and, resp., the opening piercer 12 is connected to the combustion chamber bottom 10 by form closure and/or material connection and/or force closure. The opening piercer 12 faces away from the combustion chamber interior (cf. FIG. 3).

The opening device and, resp., the opening piercer 12 is configured as pyramid tip or pyramid-shaped tip in the shown example. It is further imaginable to configure the opening device as cross piercer and/or round piercer and/or flat piercer and/or ring cutter (cf. FIG. 4).

Figure 3:
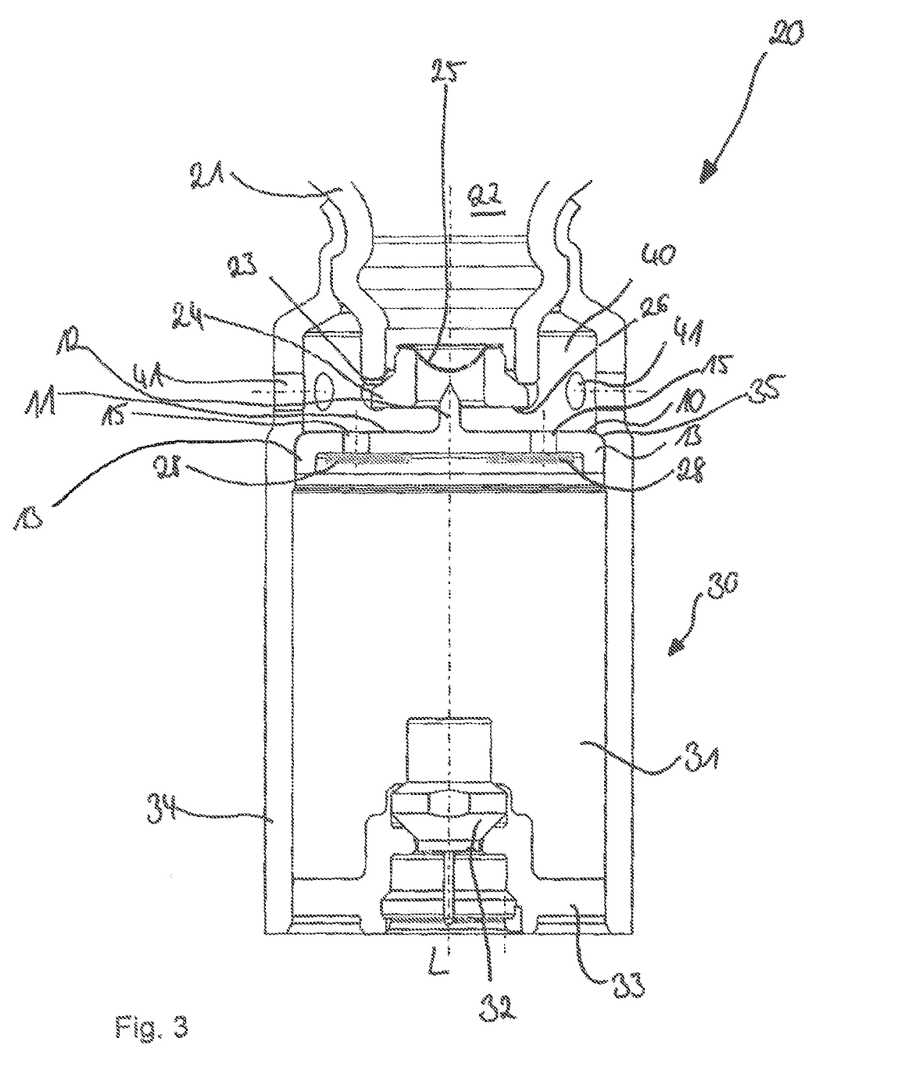
FIG. 3 is a sectional representation of an igniter-side portion of a hybrid inflator according to the invention comprising a combustion chamber according to the invention without gas application on the combustion chamber side (idle state)

The combustion chamber bottom 10 is substantially disk-shaped but further includes a radially projecting collar 13 which serves for connection to a combustion chamber sidewall (cf. FIG. 3). The collar 13 is formed perpendicularly to the surface 11 of the combustion chamber bottom 10 facing away from the combustion chamber interior.

Figure 2:
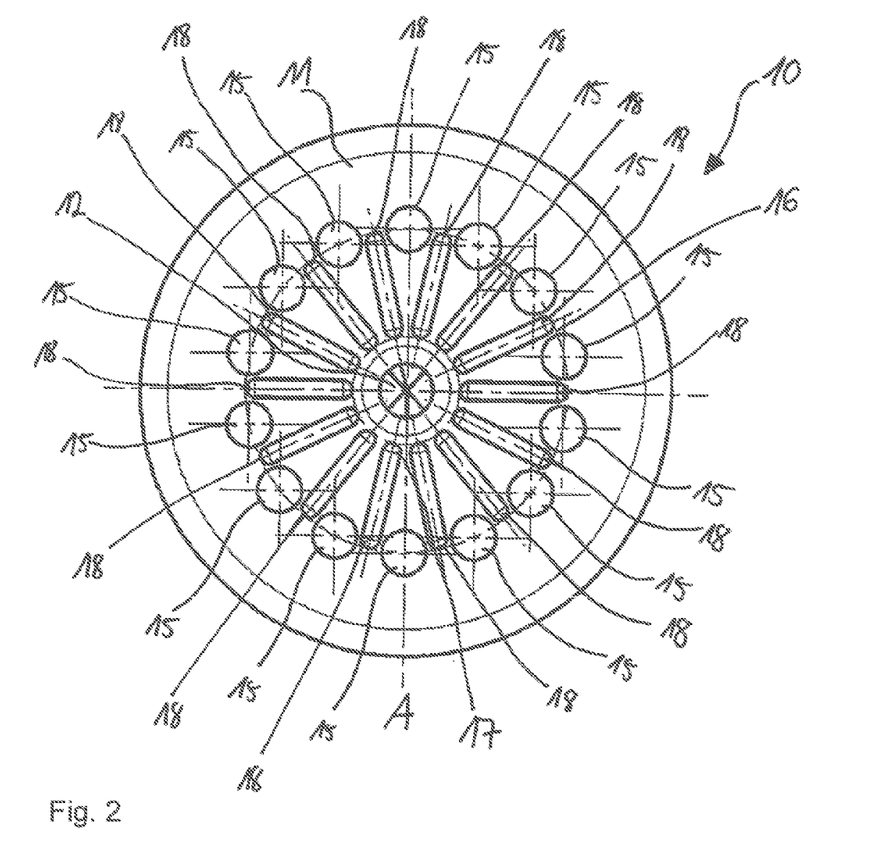
FIG. 2 is a top view onto a combustion chamber bottom of a combustion chamber including an opening device.

As is evident from FIG. 2 in a top view onto the combustion chamber bottom 10, the combustion chamber bottom 10 has a circular shape. The cross-section and, resp., the shaping of the combustion chamber bottom 10 is adapted to the combustion chamber and the combustion chamber interior (cf. FIG. 3).

In the combustion chamber bottom 10 discharge orifices 15 are formed. In the present case, fourteen discharge orifices 15 are formed in the combustion chamber bottom 10. Two discharge orifices 15 at a time are formed relative to the center of the combustion chamber bottom 10, i.e.

opposite to the opening piercer 12. A first pair of discharge orifices 15 is formed, for example, by a discharge orifice 15 formed at the 12 o'clock position and another discharge orifice 15 formed at the 6 o'clock position. All discharge orifices 15 are formed on a concentric outer circle 16. The two discharge orifices 15 at the 6 and 12 o'clock positions are located on an axis A which moreover extends through the opening piercer 12. The axis A constitutes a mirror axis to which the remaining 12 discharge orifices 15 are arranged mirror-symmetrically.

The discharge orifice 15 is formed as a continuous orifice from the surface 11 of the combustion chamber bottom facing away from the combustion chamber interior to the side 19 of the combustion chamber bottom 10 facing the combustion chamber bottom. In the illustrated example the discharge orifices 15 have a circular cross-section. The design of a rectangular and/or square and/or elliptic and/or oval and/or polygonal cross-section is also imaginable.

In the combustion chamber bottom 10 straight flutes 18 are formed on the side 11 of the opening piercer 12. The straight flutes 18 serve as spacers. In the shown example fourteen flutes 18 are formed in the combustion chamber bottom 10. Starting from a first concentric inner circle 17 said flutes 18 extend to the second concentric outer circle 16. On the second concentric circle 16 the discharge orifices 15 are formed. The flutes 18 are arranged equally mirror-symmetrically to the mirror axis A. The straight flutes 18 include rounded ends. Between two discharge orifices 15 at a time a rounded end of a straight flute 18 is arranged. The rounded end is located on the concentric outer circle 16. In another embodiment of the invention it is imaginable that the flutes 18 have a curved shape. It is further possible that the flutes 18 end in the discharge orifices 15. In other words, a flute 18 might be connected to a discharge orifice 15. In the shown example the discharge orifices 15 are separated over the surface from the flutes 18.

In FIG. 3 an igniter-side portion of a hybrid inflator 20 according to the invention including a combustion chamber 30 according to the invention having a combustion chamber bottom 10 is shown. As regards concurrent reference numerals and the meaning thereof, the explanations regarding the embodiment according to FIGS. 1 and 2 are referred to.

The hybrid inflator 20 includes a compressed gas tank 21 having an interior 22. For reasons of clarity, a complete representation of the compressed gas tank 21, i.e. a pressure-tight closure of the compressed gas tank 21 to the top, was renounced. In FIG. 3 the interior 22 is pressurized already. That is to say, pre-compressed gas, preferably cold gas, is provided in the interior 22. This is evident in FIG. 3 from the fact that a membrane 25 closing the compressed gas tank is curved downwards, i.e. away from the interior 22, in the shown example. The compressed gas to be filled into the compressed gas tank 2 during manufacture of the hybrid inflator 20 may be pre-compressed gas such as nitrogen, argon, helium or oxygen, or a mixture of two or more of said gases.

The shown combustion chamber interior 31 is still unpressurized and merely atmospheric pressure is prevailing there, as the igniter 32 is still idling, i.e. is not yet activated and, resp., ignited.

In FIG. 3 moreover an igniter carrier 33 and the igniter 32 are shown. The combustion chamber 30 further comprises a sleeve-type combustion chamber sidewall 34 confining the combustion chamber interior 31. In the illustrated example the combustion chamber sidewall is circular-cylindrical, i.e. the shown combustion chamber interior has a circular cross-section.

From FIG. 3 it is evident that the opening piercer 12 of the combustion chamber bottom 10 is arranged on the surface 11 facing away from the combustion chamber interior 31 and faces away from the combustion chamber interior 31. The combustion chamber bottom 10 is tightly connected to the combustion chamber sidewall 34 so that the combustion chamber bottom 10 is bendable in the case of operation. For tightly connecting the combustion chamber bottom 10 to the combustion chamber sidewall 34 a material-bonding and/or positive and/or non-positive connection is imaginable. In the shown example, the combustion chamber bottom 10 is press-fitted in the sleeve-type combustion chamber sidewall 34. For this purpose, the collar 13 of the combustion chamber bottom 10 contacts a notch 35 of the combustion chamber sidewall 34. The notch 35 secures the combustion chamber bottom 10 upon pressurizing the combustion chamber inside against complete movement or release or displacement of the combustion chamber bottom 10 in the direction of the compressed gas tank 21.

When burning a propellant provided in the combustion chamber interior 31, which is not shown for reasons of clarity in FIG. 3, the pressure in the combustion chamber interior 31 increases so that the combustion chamber bottom 10 bends in the direction of the compressed gas tank 21 to be opened, with the opening piercer 12 opening and piercing the membrane 25 closing the compressed gas tank 21. In other words, during operation the opening piercer 12 moves along the longitudinal axis L in the direction of the membrane 25 without the complete combustion chamber bottom 10 being moved, as the latter remains tightly connected to the combustion chamber sidewall 34 in the area of its collar 13. Due to the bending of the combustion chamber bottom 10, the opening piercer 12 arranged at the combustion chamber bottom 10 can perform a lifting movement upwards along the longitudinal axis L.

The discharge orifices 15 of the combustion chamber bottom 10 include a sealing cover 28, especially a plugging, on the side 19 of the combustion chamber interior 31. In other words, the discharge orifices 15 are closed in the idle state on the side 19 of the combustion chamber interior 31 by a sealing cover 28, i.e. the shown plugging, with the sealing cover 28 being adapted to be destroyed in the case of operation such that the combustion chamber 30, especially the combustion chamber interior 31, is fluid-communicated with a mixing chamber 40.

The compressed gas tank 21 comprises an opening 23 which in the idle state is closed by the membrane 25 and during operation can be destroyed so that the compressed gas tank 21, especially the interior 22 of the compressed gas tank 21, is fluid-communicated with the mixing chamber 40.

In the case of operation, the fluid communication from the compressed gas tank 21 to the mixing chamber 40 can be established earlier than the fluid communication from the combustion chamber 30, especially from the combustion chamber interior 31, to the mixing chamber 40.

The sealing cover 28 is preferably dimensioned so that in the case of operation the fluid communication from the compressed gas tank 21 to the mixing chamber 40 can be established earlier than the fluid communication from the combustion chamber 30, especially from the combustion chamber interior 31, to the mixing chamber 40. The sealing covers 28 of the discharge orifices 15 are dimensioned regarding the material and/or the material thickness such that the membrane 25 is destroyed, due to bending of the combustion chamber bottom 10 and the accompanying piercing of the membrane 25 by the opening piercer 12, before the destruction and, resp., bursting of the sealing covers 28. The sealing cover 28 can be constituted by a disk or foil made of e.g. copper, aluminum or steel.

The gas or cold gas of the compressed gas tank 21 thus is the first to flow into the mixing chamber 40 and through lateral orifices 41 into an airbag (not shown) of an airbag module. After further and continuous pressure increase in the combustion chamber 30 and, resp., in the combustion chamber interior 31, at least one sealing cover 28 bursts so that hot gas flows from the combustion chamber 30 into the mixing chamber 40 so that the gas or cold gas of the compressed gas tank 21 is cooled in the mixing chamber 40.

The design of the operating pressure of the combustion chamber 30 preferably has to be determined so that, even when the sealing cover 28 opens or bursts early, the pressure in the combustion chamber interior 31 is sufficient to cause the combustion chamber bottom 10 to bend in the direction of the membrane 25 so that the opening piercer 12 opens and, resp., pierces the membrane 25 closing the compressed gas tank 21.

Moreover the compressed gas tank 21 includes a membrane holder 24 comprising the membrane 25. The membrane holder is arranged at the opening-side wall 23 of the compressed gas tank 21 and is connected to the same. The membrane 25 is retained by the membrane holder 24. The combustion chamber bottom 10 preferably can rest on the membrane holder 24 in the case of pressurization on the side 10 of the combustion chamber interior 31.

On the surface 26 facing away from the compressed gas tank 21 at least one spacer, especially in the form of an extension and/or a groove and/or a flute and/or a recess and/or an indentation may be formed in the membrane holder 24. The spacer can be formed in the membrane holder 24 additionally or alternatively to the spacer formed in the combustion chamber bottom 10 (cf. FIG. 2). The formation of one spacer or plural spacers, resp., in the combustion chamber bottom and/or in the membrane holder ensures that the gas or cold gas of the compressed air tank 21 can flow out of the compressed gas tank 21 even when the combustion chamber bottom 10, especially the surface 11 of the combustion chamber bottom 10, contacts the membrane holder 24, especially the surface 26. The described spacers (flutes 18 in the combustion chamber bottom 10) thus prevent the efficient discharge cross-section for the gas or cold gas of the compressed gas tank from being too small for functional discharge. Accordingly, controlled discharge, i.e. discharge of the gas earlier in time and subsequent discharge of a combustion gas from the combustion chamber 30, which is especially gentle to the deployment and the load of an airbag, is achieved by the hybrid inflator according to the invention.

Figure 4:
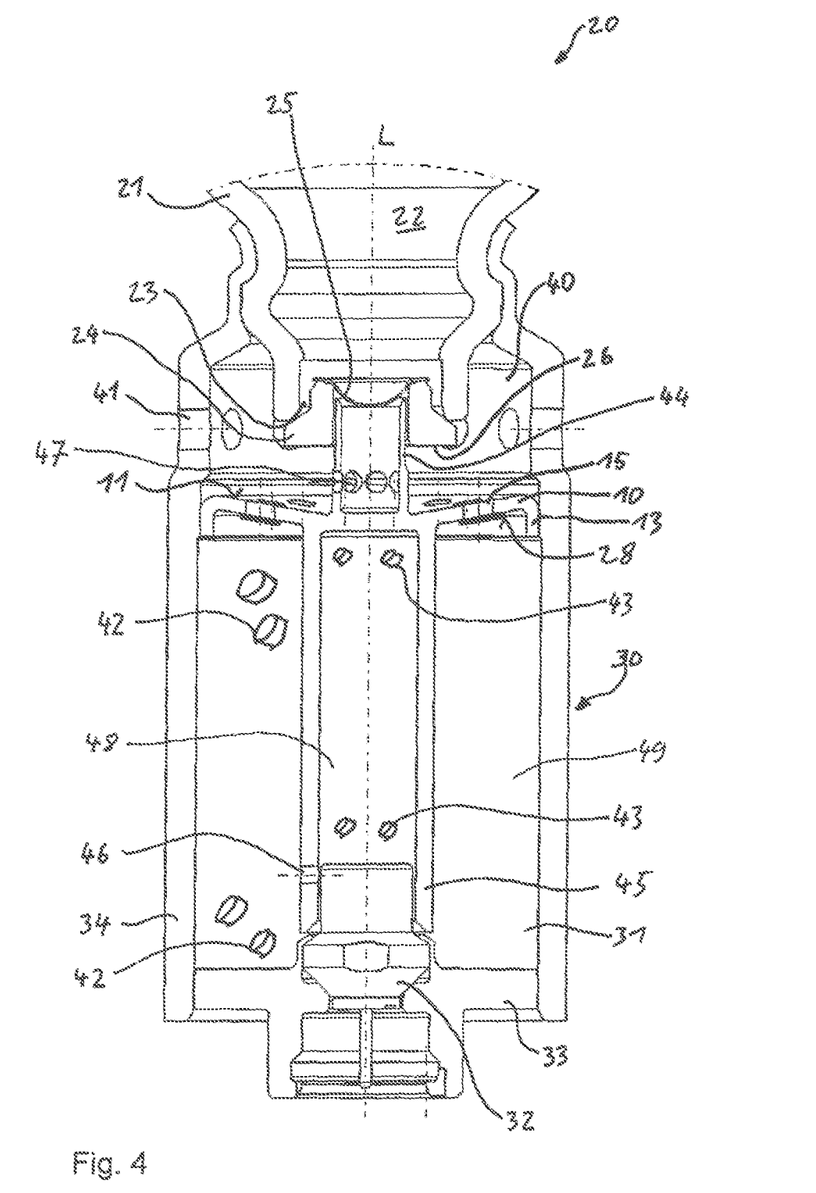
FIG. 4 is a sectional representation of an igniter-side portion of another hybrid inflator according to the invention comprising another combustion chamber according to the invention without gas application on the combustion chamber side (idle state)

In FIG. 4 an igniter-side portion of another hybrid inflator 20 according to the invention comprising a further combustion chamber 30 according to the invention having a combustion chamber bottom 10 is shown without gas pressurization on the combustion chamber side, i.e. in the idle state. As regards concurrent reference numerals and the meaning thereof, the explanations concerning the embodiment according to FIGS. 1, 2 and 3 are referred to.

The hybrid inflator 20 of FIG. 4 is basically designed just as the hybrid inflator 20 of FIG. 3 but differs therefrom mainly as regards the configuration and additional functions of the combustion chamber bottom 10. In FIG. 4 the combustion chamber bottom 10 includes a ring cutter 44 which is arranged centrally, substantially in parallel to the longitudinal axis L, on the surface 11 facing away from the combustion chamber interior and is formed integrally with the combustion chamber bottom 10, wherein the ring cutter 44 may as well be a separate component tightly connected to the combustion chamber bottom 10. The ring cutter 44 is a hollow cylinder having a circular cross-section and on its end face which is turned away from the surface 11 facing away from the combustion chamber interior has an end in the form of a cutting edge which is designed so that the membrane 25 closing the compressed gas tank 21 can be opened and destroyed, resp., by the ring cutter 44 in the case of operation.

The ring cutter 44 in addition includes plural outlets 47 at the end portion turned away from its cutting edge, wherein all outlets 47 are arranged at the same axial height of the ring cutter 44 such that during bending (case of operation cf. FIG. 5) of the combustion chamber bottom 10 and thus during an axial lifting movement of the ring cutter 44 toward the membrane holder 24 the outlets 47 are not covered by the membrane holder 24, i.e. the complete flow area of all outlets 47 is kept free in the case of operation. One single outlet 47 is technically sufficient, wherein preferably two to eight, especially four to six outlets 47 may be present.

In FIG. 4, the combustion chamber bottom 10 includes on its side 19 facing the combustion chamber interior 31 an integrally formed igniting sleeve 45 which is designed as hollow cylinder having a circular cross-section substantially in parallel to the longitudinal axis L. The igniting sleeve 45 may as well be a separate component tightly connected to the combustion chamber bottom 10. The igniting sleeve 45 has an outer diameter which is approximately twice the outer diameter of the ring cuter 44 and is arranged, just as the latter, concentrically with respect to the longitudinal axis L.

The igniting sleeve 45 extends from the side 19 of the combustion chamber bottom 10 facing the combustion chamber interior 31 almost through the complete combustion chamber 30 and, resp., the combustion chamber interior 31 and, with its open end opposite to the side 19 of the combustion chamber bottom, is attached onto the igniter 32, especially onto the axial end face thereof, and, resp., surrounds the same at least partially. The igniting sleeve 45 is positioned relative to the igniter 32 such that the igniter 32 closes the open end of the igniting sleeve 45, the igniting sleeve 45 confining with the igniter 32 a cylindrical igniting chamber 48 which is at least partly filled with an igniting mixture 43. From such formation of the igniting chamber 48, from the geometric viewpoint, around the igniting chamber 48 an annular chamber 49 is resulting which can be regarded as efficiently usable combustion chamber 30. The annular chamber 49 or, resp., combustion chamber 30 is at least partially filled with propellant 42. The propellant 42 and the igniting mixture 43 are a known pyrotechnical solid propellant that may be provided in common molded articles such as compressed tablets, granules or extruded bodies, wherein the shape, size or chemical composition of the propellant 42 and of the igniting mixture 43 may be identical or different.

The igniting sleeve 45 in addition has at least one overflow orifice 46 at its end facing the igniter 32, wherein the at least one overflow orifice 46 is arranged in the idle state shown in FIG. 4 such that it is covered by the igniter 32, especially by the radial front area thereof, such that no parts of the igniting mixture 43 can pass through the overflow orifice 46 from the igniting chamber 48 into the annular chamber 49. The at least one overflow orifice 46 is closed so to speak by the igniter 32 on the igniter chamber side such that immediately after igniting the igniting mixture 43 still no burning gas or hot gas being formed can pass through the at least one overflow orifice 46 into the annular chamber 49. Only after continuing combustion of the igniting mixture 43 the igniting sleeve 45 is moved away from the igniter 32, as will be described in more detail hereinafter, so that burning gas or hot gas may flow through the at least one overflow orifice 46 into the annular chamber 49 as specified (cf. FIG. 5).

The at least one overflow orifice 46 can also be additionally closed from the side of the ignition chamber 48 by a burst foil or plugging not shown which is opened at a predefined pressure in the ignition chamber 48 so as to allow combustion gas flowing into the annular chamber 46 through the at least one overflow orifice 46. Also, the at least one overflow orifice 46 may be positioned to be axially more distant from the igniter 32 than shown in FIG. 4, wherein in such case it cannot be closed by the igniter 32 any longer but exclusively by a burst foil or plugging not shown.

Figure 5:
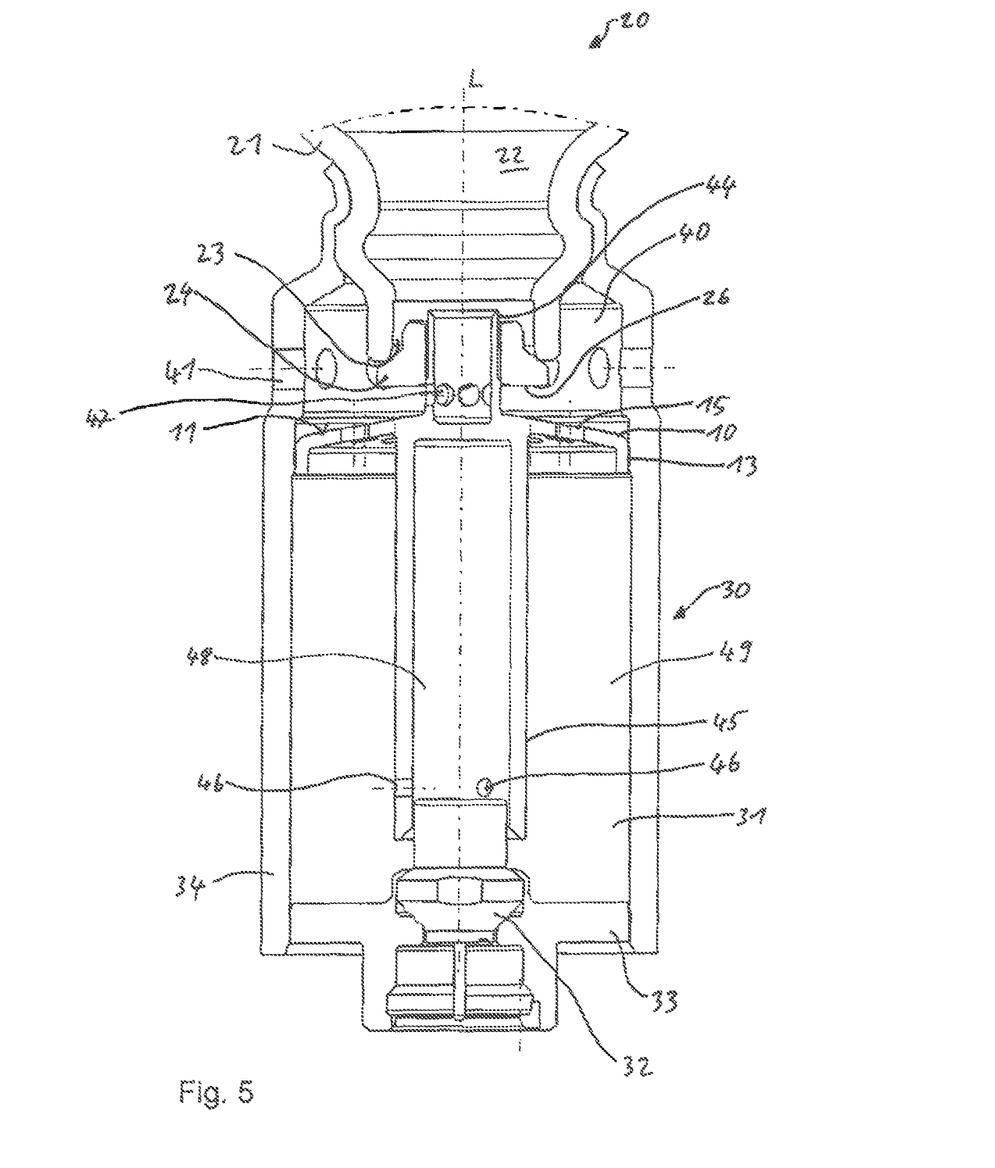
FIG. 5 is a sectional representation of the portion of the hybrid inflator according to the invention shown in FIG. 4 including its combustion chamber according to the invention, however with gas application on the combustion chamber side (during operation).

It is applicable to FIG. 4 and FIG. 5 that, just as in FIG. 2, the combustion chamber bottom 10 is tightly connected, in the areas of its formed collar 13, to the combustion chamber sidewall 34 so that the combustion chamber bottom 10 is bendable during operation. Concerning the tight connection of the combustion chamber bottom 10 to the combustion chamber sidewall 34 a connection by material bonding and/or form closure and/or force closure is possible. In the case of FIGS. 4 and 5, the combustion chamber bottom 10 is connected to the combustion chamber sidewall 34 by material bonding, and especially welded, so that upon pressurization on the combustion chamber inside it is not possible to completely move or release or displace the combustion chamber bottom 10 in the direction of the compressed gas tank 21.

In FIG. 4 the combustion chamber bottom 10 is somewhat pre-formed or pre-bent in the direction of the igniter 32 toward the side of the combustion chamber interior 31. In other words, the angle between the surface portion of the combustion chamber bottom 10 including the discharge orifices 15 and the collar 13 of the combustion chamber bottom is less than 90°. The combustion chamber bottom 10 of FIG. 4 is thus biased downwards in the direction of the igniter 32, which has an advantageous effect during operation (cf. FIG. 5), as there a larger lifting distance or lifting motion of the ring cutter 44 is possible.

FIG. 5 illustrates the igniter-side portion of the hybrid inflator 20 according to the invention of FIG. 4 with gas admission on the combustion chamber side, i.e. in the case of operation. As regards concurrent reference numerals and the meaning thereof, the explanations regarding the embodiment according to FIGS. 1,2,3 and 4 are referred to.

The combustion chamber bottom 10 of FIG. 5 is deformed or bent in the direction of the opening 23 of the compressed gas tank 21, i.e. opposite to the direction in which it is pre-bent in FIG. 4. In other words, the angle between the surface portion of the combustion chamber bottom 10 including the discharge orifices 15 and the collar 13 of the combustion chamber bottom 10 amounts to more than 90°. The discharge orifices 15 are no longer closed by the sealing cover 28 (see FIG. 4) but are opened and, resp., destroyed already by the pressure built up in the combustion chamber interior 31 so that the combustion chamber interior 31 is fluid-communicated with the mixing chamber 40 via the discharge orifices 15.

In FIG. 5 the end of the ring cutter 44 including the cutting edge is positioned in an area of the compressed gas tank 21 which is closed by the membrane 25 in the idle state (cf. FIG. 4). In other words, the position of the ring cutter 44 of FIG. 5 shows that the membrane 25 of the compressed gas tank 21 is destroyed and the compressed gas tank 21 is opened so that the stored gas or cold gas may flow out of the compressed gas container 21. The compressed gas tank 21 is fluid-communicated to the mixing chamber 40 via the outlets 47 of the hollow-cylindrical ring cutter 44.

FIG. 5 illustrates a position of the igniting sleeve 45 at which the latter is lifted in the direction of the orifice 23 of the compressed gas tank 21 and, resp., away from the igniter 32 by the afore-described deformation of the combustion chamber bottom 10 to which it is tightly connected. Accordingly, the igniting sleeve 45 is positioned so far away from the igniter 32 that the at least one overflow orifice 46 of the igniting sleeve 45 is released. In other words, in FIG. 5 the igniting sleeve 45 is positioned so that the igniting chamber 48 of the igniting sleeve 45 is fluid-communicated with the combustion chamber interior 31 via the at least one overflow orifice 46.

Hereinafter the functioning of the hybrid inflator 20 of FIGS. 4 and 5 shall be described. In other words, it will be explained in which way the hybrid inflator 20 is brought from its idle state (cf. FIG. 4) to the operating state (cf. FIG. 5).

After the hybrid inflator 20 shown in FIG. 4 has been activated and hence the igniter 32 thereof has received an electrical activation signal for ignition, the igniter opens at its end face so as to discharge hot gases and/or hot particles for igniting the adjacent igniting mixture 43. By the pressure forming in the igniting chamber 48 the igniting sleeve 45 is then lifted away from the igniter 32, substantially in parallel to the longitudinal axis L, so far that the at least one overflow orifice 46 is released so that further hot gas and/or hot particles may flow from the igniting chamber 48 into the annular chamber 49 so as to ignite the propellent 42 positioned there and to cause an increase in pressure in the annular chamber 49.

Since all three components, i.e. the igniting sleeve 45, the combustion chamber bottom 10 and the ring cutter 44, are tightly Interconnected, the afore-described lifting of the igniting sleeve 45 causes bending of the combustion chamber bottom 10 and thus a positioning and a lifting motion of the ring cutter 44 in the direction of the compressed gas tank 21 and, resp., the closing membrane 25 thereof. The lifting motion of the ring cutter 44 is configured so that the membrane 25 closing the compressed gas tank 21 is reliably opened and pierced by the ring cutter 44 so that gas or cold gas may flow from the compressed gas tank 21 into the interior of the hollow-cylindrical ring cutter 44 and through the outlets 47 thereof first into the mixing chamber 40 and then into an airbag (not shown) through the lateral openings 41 of the hybrid inflator 20.

The lifting motion of the ring cutter 44 can be solely reached by the increase in pressure in the igniting chamber 48, wherein also the pressure increase in the annular chamber 49 may additionally contribute to the lifting motion of the ring cutter 44 up to the final position thereof (cf. FIG. 5).

After the propellent 42 has been ignited, as afore-described, and an appropriately predefined pressure has formed in the annular chamber 49, the sealing cover 28 is thus opened and, resp., destroyed so that hot gas can flow into the mixing chamber 40 through the discharge orifices 15 of the combustion chamber bottom 10 to establish a fluid communication between the combustion chamber 30 and, resp., the combustion chamber interior 31 and the mixing chamber 40 and an airbag (not shown) through the lateral openings 41 of the hybrid inflator 20.

The hybrid inflator 20 is designed, especially by means of the sealing cover 28, so that the fluid communication from the compressed gas tank 21 to the mixing chamber 40 is formed earlier than the fluid communication from the combustion chamber 30 to the mixing chamber 40. Thus initially solely cold gas can flow from the compressed gas tank 21 via the mixing chamber 40 into the outer area of the hybrid inflator 20 to permit gentle deployment of the airbag, wherein subsequently hot gas from the combustion chamber 30 is mixed with cold gas from the compressed gas tank 21 which than flows into the airbag to cause the complete deployment thereof.

The combustion chamber 30 according to the invention including an opening device or opening piercer 12 for a compressed gas tank 21 as well as the hybrid inflator 20 according to the invention consequently comprise no displaceable or movable component as it is known from prior art. Moreover, the hybrid inflator 20 according to the invention and, resp., the combustion chamber 30 according to the invention are distinguished by few structurally simple components.

LIST OF REFERENCE NUMERALS 10 combustion chamber bottom
11 surface facing away from the combustion chamber interior
12 opening piercer
13 collar
15 discharge orifice
16 outer circle
17 inner circle
18 flute
19 side of combustion chamber bottom
20 hybrid inflator
21 compressed gas tank
22 interior of compressed gas tank
23 opening of compressed gas tank
24 membrane holder
25 membrane
26 surface of membrane holder
28 sealing cover
30 combustion chamber
31 combustion chamber interior
32 igniter
33 igniter carrier
34 combustion chamber sidewall
35 notch
40 mixing chamber
41 lateral opening
42 propellant
43 igniting mixture
44 ring cutter
45 igniting sleeve
46 overflow orifice
47 outlet of ring cutter
48 igniting chamber
49 annular chamber
A axis
L longitudinal axis

The invention claimed is:

1. A combustion chamber (30) comprising an opening device for a compressed gas tank (21) of a hybrid inflator (20), wherein the combustion chamber (30) comprises a sleeve-type combustion chamber sidewall (34) confining a combustion chamber interior (31) and a combustion chamber bottom (10), wherein the opening device is arranged on a surface (11) of the combustion chamber bottom (10) facing away from the combustion chamber interior (31) and faces away from the combustion chamber interior (31), wherein the combustion chamber bottom (10) is tightly connected to the combustion chamber sidewall (34) so that during operation the combustion chamber bottom (10) is bendable.

2. The combustion chamber (30) according to claim 1, wherein the opening device is an opening piercer (12) comprising at least one of a pyramid tip, round piercer, flat piercer, cross piercer, and ring cutter (44).

3. The combustion chamber (30) according to claim 1, wherein at least one discharge orifice (15) is formed in at least one of the combustion chamber bottom (10) and the combustion chamber sidewall (34) the at least one discharge orifice (15) having a sealing cover (28) on the side of the combustion chamber interior (31).

4. The combustion chamber (30) according to claim 1, wherein in the combustion chamber bottom (10) at least one spacer comprising at least one of an extension, a groove, a flute (18), a recess, and an indentation is formed on the surface (11) of the opening device.

5. The combustion chamber (30) according to claim 4, wherein the combustion chamber bottom (10) on the surface (11) of the opening device plural spacers are formed as straight or curved flutes (18) which extend from a first inner circle (17) to a second outer circle (16), wherein on the second outer circle (16) at least one discharge orifice (15) is formed.

6. A hybrid inflator (20) comprising a compressed gas tank (21) and a combustion chamber (30) according to claim 1.

7. The hybrid inflator (20) according to claim 6, wherein the compressed gas tank (21) comprises an opening (23) which in an idle state of the hybrid inflator (20) is closed by a membrane (25), the membrane (25) being destructible, the compressed gas tank (21) being in fluid communication with a mixing chamber (40) when the membrane (25) is destroyed.

8. The hybrid inflator (20) according to claim 7, wherein in at least one of the combustion chamber bottom (10) and the combustion chamber sidewall (34) at least one discharge orifice (15) is formed which in the idle state of the hybrid inflator (20) is closed on the side of the combustion chamber interior (31) by a sealing cover (28), wherein during operation, the sealing cover (28) is destructible so that the combustion chamber (30) is fluid-communicated with the mixing chamber (40) and/or an airbag.

9. The hybrid inflator (20) according to claim 8, wherein during operation the fluid communication from the compressed gas tank (21) to the mixing chamber (40) can be established earlier than the fluid communication from the combustion chamber (30) to the mixing chamber (40), by dimensioning the sealing cover (28).

10. The hybrid inflator (20) according to claim 7, wherein the membrane (25) of the compressed gas tank (21) can be destroyed by an opening device comprising by an opening piercer (12) or a ring cutter (44) having at least one outlet (47).

11. The hybrid inflator (20) according to claim 10, wherein the combustion chamber bottom (10) is configured with the ring cutter (44) and an igniting sleeve (45) having an overflow orifice (46) as a pre-assembled, subassembly, wherein in the ring cutter (44) and the igniting sleeve (45) are arranged on opposite front sides of the substantially disk-shaped combustion chamber bottom (10).

12. The hybrid inflator (20) according to claim 11, wherein the igniting sleeve (45) comprises an igniting chamber (48) including an igniting mixture (43) and extends into the combustion chamber (30) so that around the igniting sleeve (45) an annular chamber (49) including a propellant (42) is formed.

13. The hybrid inflator (20) according to claim 12, wherein at least one of the sealing cover (28) and the igniting sleeve (45) is dimensioned so that during operation such pressure can be built up in at least one of the combustion chamber (30) and the igniting chamber (48) so that the membrane (25) of the compressed gas tank (21) is destructible by the opening device by bending the combustion chamber bottom (10) toward the membrane (25).

14. The hybrid inflator (20) according to claim 8, wherein the sealing cover (28), is dimensioned so that of during operation the combustion chamber (30) is fluid-communicated with the mixing chamber (40) and/or an airbag.

15. The hybrid inflator (20) according to claim 12, wherein during operation the igniting chamber (48) is fluid-communicated via the overflow orifice (46) with the combustion chamber (30), the annular chamber (49), and with at least one of the mixing chamber (40) and an airbag.

16. The hybrid inflator (20) according to claim 12, wherein during operation the interior (22) of the compressed gas tank (21) is fluid-communicated via the interior of the ring cutter (44) via the outlet (47) thereof, and with at least one of the mixing chamber (40) and an airbag.

17. The hybrid inflator (20) according to claim 7, wherein the compressed gas tank (21) includes a membrane holder (24) comprising the membrane (25), and wherein the combustion chamber bottom (10) can be supported on the membrane holder (24) when the side of the combustion chamber interior (31) is pressurized.

18. The hybrid inflator (20) according to claim 17, wherein in the membrane holder (24) on the surface (26) facing away from the compressed gas tank (21) at least one spacer is formed in the form of at least one of an extension, a groove, a flute, a recess, and an indentation.

19. An airbag module comprising at least one of a combustion chamber (30) and a hybrid inflator (20) according to claim 1.

20. A vehicle safety system comprising at least one of a combustion chamber (30), a hybrid inflator (20), and an airbag module according to claim 1.

21. A method of discharging fluid from an inflator according to claim 6, comprising the following steps of:

opening a membrane (25) of a compressed gas tank (21) and discharging pre-compressed gas from the compressed gas tank (21) via a mixing chamber (40) through an outer opening;

optionally releasing an overflow orifice (46) of an igniting sleeve (45) for igniting a propellant (42);

subsequently opening a sealing cover (28) of a combustion chamber interior (31) by burning the propellant (42) and discharging hot gases from the combustion chamber interior (31) into the mixing chamber (40);

mixing part of the pre-compressed gas and of the hot gas in the mixing chamber (40) to form mixed gas;

discharging the mixed gas from the mixing chamber (40) through the outer opening of the inflator.

22. The method of discharging a fluid from an inflator according to claim 6, comprising opening the membrane (25) of the compressed gas tank by bending a combustion chamber bottom (10), the membrane (25) being pierced by an opening device comprising one of an opening piercer (12) and a ring cutter (44), wherein at least areas of the combustion chamber bottom (10) along its periphery remain fixedly connected to a combustion chamber sidewall (34) of the inflator housing.

23. The combustion chamber (30) according to claim 3, wherein the sealing cover (28) is a plugging.

24. The hybrid inflator (20) according to claim 8, wherein the sealing cover (28) is a plugging.

25. The hybrid inflator (20) according to claim 9, wherein the sealing cover (28) is a plugging.

26. The hybrid inflator (20) according to claim 11, wherein the combustion chamber bottom (10) is configured with the ring cutter (44) and an igniting sleeve (45) having an overflow orifice (46) as a pre-assembled, one-piece, subassembly.

27. The hybrid inflator (2) according to claim 13, wherein the compressed gas tank (21) is destructible by the opening piercer (12) or the ring cutter (44).

28. The method of discharging fluid from an inflator according to claim 21, wherein the outer opening is a lateral opening (41).

* * * * *

UNITED STATES PATENT AND TRADEMARK OFFICE
CERTIFICATE OF CORRECTION

PATENT NO. : 9,789,845 B2  
APPLICATION NO. : 14/948545  
DATED : October 17, 2017  
INVENTOR(S) : Johannes Ebner et al.

Page 1 of 1

It is certified that error appears in the above-identified patent and that said Letters Patent is hereby corrected as shown below:

In the Claims

Column 16, Line 59 reads "wherein in the" should read --wherein the--

Column 17, Line 10 reads "that of during" should read --that during--

Signed and Sealed this
Fifth Day of December, 2017

Joseph Matal
*Performing the Functions and Duties of the*
*Under Secretary of Commerce for Intellectual Property and*
*Director of the United States Patent and Trademark Office*